United States Patent [19]

Tour et al.

[11] Patent Number: 5,236,686
[45] Date of Patent: Aug. 17, 1993

[54] PRECURSOR POLYPHENYLENE FOR AND METHOD OF PRODUCING GLASSY CARBON

[75] Inventors: James M. Tour; Eric Stephens; Joanna F. Davis, all of Columbia, S.C.

[73] Assignee: University of South Carolina, Columbia, S.C.

[21] Appl. No.: 746,714

[22] Filed: Aug. 19, 1991

[51] Int. Cl.$^5$ .................. C01B 31/00; C08G 61/10
[52] U.S. Cl. .................. 423/445; 264/29.1; 423/447.1; 423/447.2; 528/397
[58] Field of Search .............. 423/445, 449, 447.1, 423/447.2, 447.7; 264/29.1, 29.6

[56] References Cited

U.S. PATENT DOCUMENTS 4,070,333  1/1978  Jabloner ........................ 524/529

OTHER PUBLICATIONS

*Whittington's Dictionary of Plastics*, Technnomic Publishing Co., (1978) p. 273.
Tour et al., "Facile Li/HMPA-Promoted Polymerization Method for the Synthesis of Soluble Poly(phenylenes)", J. Am. Chem. Soc. (1991), vol. 113, pp. 2309-2311.
Fitzer, "From Polymers To Polymeric Carbon—A Way to Synthesize A Large Variety Of New Materials", Pure & Appl. Chem. (1980), vol. 52, pp. 1865-1882.
Fitzer, "Polymer Carbon The Start Into A New Age Of Polymer Application", *Contemporary Topics in Polymer Science*; vol. 5, Vanderberg, E. J., Ed. Plenum; New York, 1984.
Sonogashira et al., "A Convenient Synthesis of Acetylenes: Catalytic Substitutions Of Acetylenic Hydrogen with Bromoalkenes . . . " Tetrahedron Letter, No. 50, pp. 4467-4470, 1975.
Suffert et al., "Toward Molecular Electronics: A New Family of Aromatic Polymine Chelates Substituted With Alkyne Groups", Tetrahedron Letters, vol. 32, No. 6, pp. 757-760, 1991.
Stille, "The Palladium-Catalyzed Cross-Coupling Reactions of Organotin Reagents with Organic Electrophiles", Angew, Chem. Int. Ed. Engl. 25 (1986) pp. 508-524.

*Primary Examiner*—Wayne Langel
*Assistant Examiner*—Stephan G. Kalinchak
*Attorney, Agent, or Firm*—Brumbaugh, Graves, Donohue & Raymond

[57] ABSTRACT

Polymeric carbon can be formed by a method comprising the steps of (a) polymerizing 1-bromo-4-lithiobenzene to form a brominated polyphenylene wherein the ratio of brominated to non-brominated residues in the polymer is 1:5 or greater;

(b) functionalizing the brominated polyphenylene to replace the bromide groups with a substituted or unsubstituted acetylene group; and (c) heating the functionalized polymer to a temperature of 900° C. to form polymeric carbon. Preferably, the brominated polyphenylene is formed in an ethereal solvent such as tetrahydrofuran and then functionalized using a palladium catalyst and a copper catalyst. When the acetylene substituent is phenylacetylene, the product of the method is glassy carbon.

20 Claims, No Drawings

PRECURSOR POLYPHENYLENE FOR AND METHOD OF PRODUCING GLASSY CARBON

BACKGROUND OF THE INVENTION

This application relates to the production of polymeric carbon materials, particularly glassy carbon materials for use, e.g. in electronic components and high temperature materials applications.

Carbon materials synthesized from organic materials have found utility in a wide range of applications including the aerospace, sporting goods, electronic and automotive industries. The organic polymer is heated to a temperature, e.g. 900° C., sufficient to cause charring of the material to form the carbon product. For applications involving molded products, it is desirable that the weight loss on charring be sufficiently low (generally less than 15%) to avoid fracture of the molds or formation of cavities in the final monolithic material. Further, for use in molding the polymeric material should exhibit a well defined melting point prior to conversion to the carbon material (i.e., prior to charring) so that it can be drawn into the mold in a molten state during processing. A flow or melting event during processing is necessary to produce a solid monolithic product of glassy carbon upon thermal treatment. Materials without a well defined melting point tend to form powders on charring which are useful in non-molded applications. See Fitzer, E. Pure & Appl. Chem. 52, 1865-1882 (1980); Fitzer, E. in *Contemporary Topics in Polymer Science* 5, Vandenberg, E. J. ed., Plenum, N.Y. 1984, pp 101-138.

It is known that glassy carbon material can be made by a process involving the steps of
(1) synthesis of 1,3-diethynylbenzene from 1,3-diacetylbenzene;
(2) polymerization of the 1,3-diethynylbenzene with a Ni catalyst, making sure to stop the polymerization prior to insolubility;
(3) addition of low molecular weight oligomers to such as acetylenically substituted aromatic compounds, to help flow;
(4) preheating to 170°-200° C.; and
(5) heating the material to 900° C. in a nitrogen atmosphere to form a glassy carbon material. See U.S. Pat. No. 4,070,333 incorporated herein by reference.

It has also been suggested that an oligophenylene-derived material with terminal alkyne groups is a suitable starting material for making isotropic polymeric carbon. Fitzer, E., Pure Appl. Chem. 52, 1865 (1980). This material does not provide the melting event necessary to the making of monolithic products, although it does have a high char yield.

The present invention provide an alternative process for making carbon materials with a high char yield. A preferred embodiment combines this high char yield with a distinct melting event prior to the formation of the carbon material.

SUMMARY OF THE INVENTION

In accordance with the invention, polymeric carbon can be formed by a method comprising the steps of
(a) polymerizing 1-bromo-4-lithiobenzene to form a brominated polyphenylene wherein the ratio of brominated to non-brominated residues in the polymer is 1:5 or greater;
(b) functionalizing the brominated polyphenylene to replace the bromide groups with a substituted or unsubstituted acetylene group; and
(c) heating the functionalized polymer to a temperature of 900° C. in an atmosphere to form polymeric carbon. Preferably, the brominated polyphenylene is formed in an ethereal solvent such as tetrahydrofuran and then functionalized using a palladium catalyst and a copper catalyst. When the acetylene substituent is phenylacetylene, the product of the method is glassy carbon.

DETAILED DESCRIPTION OF THE INVENTION

Polyphenylene backbone substituted with acetylene groups have been found to be a useful organic polymer for the formation of polymeric carbon materials. This material can be formed in good yield from 1-bromo-4-lithiobenzene in a two step process.

The first step is the polymerization of the 1-bromo-4-lithiobenzene to form brominated polyphenylene having a high level of meta linkages to produce a ratio of brominated to non-brominated residues of 1:5 or greater, preferably 1:2 or greater. The selection of the reaction solvent is important in order to generate polyphenylenes with higher numbers of meta linkages. In general, the polymerization reaction is carried out in an ethereal solvent at a temperature of between 0° C. and 60° C. for a period of time sufficient to yield brominated polyphenylenes having an average molecular weight of from 700 to 3500. Tetrahydrofuran (THF) is a preferred solvent, although ether and dioxane may also be used. Polar aprotic solvents such as HMPA should be avoided as this leads to substantially all para-linkages. See U.S. patent application Ser. No. 07/543,673, now U.S. Pat. No. 5,16 incorporated herein by reference and J. Amer. Chem. Soc. 113, 2309 (1991).

The second step in the process is the substitution of acetylene groups for the bromo groups of the brominated polyphenylene. This can be accomplished using palladium catalyzed cross-couplings of appropriate alkynyl tin reagents. Stille, J. K., Angew. Chem. Int'l Ed. Engl. 25, 508 (1986). This can also be accomplished by combining the brominated polyphenylene with an acetylenic compound in the presence of a palladium catalyst, a copper catalyst and a secondary amine and gradually increasing the temperature to about 100° C. over a period of about 5 hours. See Sonogashira et al. Tet. Lett. 1975, 4467; Suffert et al., Tet. Lett. 32, 757 (1991).

Either of these reactions can be carried out using acetylenic species such as silylacetylenes, alkyl acetylenes phenylacetylene or substituted phenylacetylenes. Examples of substituted phenylacetylenes, e.g., phenylacetylenyl phenyl acetylene

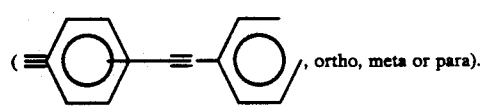, ortho, meta or para).

The acetylenic compound is advantageously employed in a molar excess of from about 1.5 to 5 fold relative to the brominated polyphenylene.

Palladium catalysts useful in the present invention are dichlorobis(triphenyl phosphine)palladium(II) and tetrakis(triphenylphosphine)palladium(0).

Copper catalysts useful in the invention include copper(I)iodide and copper(I)bromide.

Amines useful in the present invention are diisopropylamine and n-butylamine. The amine is added in approximately equimolar amounts to the acetylenic species.

The product of this reaction is a phenylacetylene substituted polyphenylene of the formula:

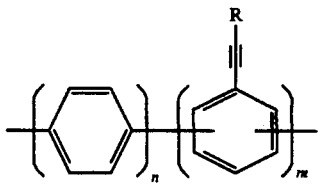

wherein the ratio m/n is from about 0.5 to 1 and R is selected from among H, substituted and unsubstituted phenyl groups, alkyl groups and alkyl silyl groups. The polymer wherein R is H can be made from material wherein R is trimethylsilyl by reaction with tetra(n-butyl)ammonium fluoride or as shown in Example 4 below.

When these materials are heated to a temperature of 900° C. in an inert e.g., nitrogen atmosphere they char to form polymeric carbon. The char yield and whether or not a melting event occurs depends on the nature of the acetylenic substituent. Trimethyl silyl substituted and alkyl substituted systems show far more weight loss on heating than terminal (R=H) or phenylated acetylenes. This is consistent with previous reports that higher carbon to hydrogen ratios in the pre-thermalized material translates into lower weight loss on heating (provided that coupling can occur). The terminal acetylenes and phenylated acetylene-substituted polymers of the present invention which have the capacity of coupling either by dimerization or cyclotrimerization and have very high C/H ratios provide nearly ideal materials for thermalization into either powdery or glassy carbon materials.

EXAMPLE 1

Preparation of Brominated Polyphenylene in THF

To a 100 mL round bottom flask equipped with a stir bar and reflux condenser and containing 1,4-dibromobenzene (3.776 g, 16.0 mmol) in THF (16 mL) under a nitrogen atmosphere t-butyllithium (10.4 mL, 24 mmol, 2.3M in pentane) was added at −78° C. via syringe pump over a period of 1 h. The ensuing milky white to yellow reaction mixture was stirred at −78° C. form an additional 15 min. The reaction mixture was then allowed to warm to room temperature and stir for 2 h. The black reaction solution was then poured into water (25 mL). The organic layer was separated and the aqueous portion extracted with methylene chloride (3x). The combined organic layers were washed with water and dried over magnesium sulphate. Filtration and removal of the solvent in vacuo gave a tan-brown solid. Fractional precipitation with ether gave 0.5925 g (50%) of a tan-brown solid. FTIR (KBr) 3027.0, 1901.1, 1590.6, 1472.4, 1384.0, 1249.1, 1179.6, 1101.5, 1073.3, 1002.2, 967.2, 888.9, 809.4, 787.3, 761.4, 697.9, 506.3 cm$^{-1}$. $^1$H NMR (500 MHz, CDCl$_3$) δ7–8 (m). No aliphatic peaks were detected. $M_w$=1000–2732, $M_w/M_n$=1.51–7.42. A variety of brominated polyphenylenes were made under similar conditions as reflected in Table 1.

EXAMPLE 2

Crosscoupling of phenylacetylene With brominated polyphenylene

To a screw cap tube containing brominated polyphenylene (0.2934 g, 0.96 mmol, $M_w$=1603, $M_w/M_n$=3.760), copper(I) iodide (0.0076 g, 0.04 mmol), and dichlorobis(triphenylphosphine)palladium(II) (0.0336 g, 0.048 mmol) in THF (3 mL) was added at room temperature phenylacetylene (0.32 mL, 2.9 mmol) and diisopropylamine (0.4 mL, 2.9 mmol). The ensuing black reaction solution was stirred at room temperature for 1 h then warmed to 60° C. for 10 h and 100° C. for 5 h. The reaction mixture was allowed to cool to room temperature and poured into water (20 mL). The organic layer was separated and the aqueous portion extracted with methylene chloride (3x). The combined organic layers were washed with aqueous sodium bicarbonate and water. Filtration and removal of the solvent in vacuo gave a brown oil. Fractional precipitation with ether gave 0.2266 g (72%) of a gray/brown ether insoluble solid. FTIR (KBr) 3029.2, 2213.9, 1944.1, 1910.2, 1596.3, 1490.4, 1473.5, 1441.2, 1388.2, 1068.6, 1003.8, 911.1, 890.2, 816.8, 789.2, 753.7, 688.7, 538.6, 520.6 cm$^{-1}$. $^1$H NMR (300 MHz, CDCl$_3$) δ7–8 (m). No aliphatic peaks were detected. UV (CHCl$_3$) λ max 305 nm. $M_w$=2706; $M_w/M_n$=5.683. MP (DSC) 194° C.. TGA showed 10% weight loss at 670° C. and 14% weight loss at 900° C. DSC showed a melting event at 194° C. and an exotherm at 310° C. indicative of a coupling event. This procedure was repeated with brominated polyphenylene made in accordance with Example 1 as shown in Table 2. The resulting char yield for these experiments was generally very high.

EXAMPLE 3

Crosscoupling of trimethylsilylacetylene With brominated polyphenylene

To a screw cap tube containing brominated polyphenylene (0.6466 g, 2.11 mmol, $M_w$=1674, $M_w/M_n$=7.419), copper(I) iodide (0.0171 g, 0.09 mmol), and dichlorobis(triphenylphosphine)palladium(II) (0.0772 g, 0.11 mmol) in tetrahydrofuran (8 mL) was added at room temperature trimethylsilylacetylene (1.0 mL, 7.39 mmol) and diisopropylamine (1.0 mL, 7.39 mmol). The ensuing black reaction solution was stirred at room temperature for 1 h then warmed to 60° C. for 10 h and 100° C. for 5 h. The reaction mixture was allowed to cool to room temperature and poured into water (20 mL). The organic layer was separated and the aqueous portion extracted with methylene chloride (3x). The combined organic layers were washed with water. Filtration and removal of the solvent in vacuo gave a brown oil. Fractional precipitation with hexane gave 0.5478 g (80%) of a gold/brown hexane insoluble solid. FTIR (KBr) 3028.7, 2952.5, 2155.0, 1944.1, 1909.9, 1598.7, 1473.6, 1387.2, 1248.1, 1069.3, 1004.3, 864.8, 842.7, 790.3, 758.0, 697.8, 636.8 cm$^{-1}$. $^1$H NMR (500 MHz, CDCl13) δ7–8 (m, 11 H), 0.26 (br s, 9 H). $M_w$=3834; $M_w/M_n$=3.920. TGA analysis showed greater than 25% weight loss on heating to 900° C. (20° C./min under nitrogen atmosphere) and DSC showed no well defined melting point.

EXAMPLE 4

Desilylation of Poly(phenylene) Functionalized With TMS-acetylene

To a 50 mL 2-neck round bottom flask equipped with a stir bar and a reflux condenser was added at room temperature poly(phenylene) functionalized with trimethylsilylacetylene in accordance with Ex. 3 (0.2088 g, 0.64 mmol, $M_w=2847$, $M_w/M_n=2.335$), potassium carbonate (0.21 g, 1.5 mmol), methanol (5 mL) and THF (2 mL). The ensuing reaction mixture was stirred at room temperature for 1 h then heated to 60°-65° C. for 30 h. The reaction mixture was allowed to cool to room temperature and poured into water (25 mL). The organic layer was separated and the aqueous portion was extracted with methylene chloride (3X). The combined organic layer were washed with water and dried over magnesium sulphate. Filtration and removal of the solvent in vacuo gave a tan/brown solid which after fractional precipitation from ether gave 0.0527 g (29%) of a tan solid. $^1$H NMR (500MHz, CDCl$_3$) $\delta$7-8 (m,27 H), 3.13 (m, 1 H). No aliphatic peaks were detected. UV (CHCl$_3$) $\lambda_{max}$ 297 nm. $M_w=3019$, $M_w/M_n=2.320$. TGA showed 18% weight loss on heating to 900° C. (20° C./min under nitrogen atmosphere). The material did not appear to flow during TGA run. DSC showed a large exotherm at 188° C.

EXAMPLE 5

Crosscoupling of 1-(2'-phenylethynyl)-4-ethynylbenzene With brominated polyphenylene The same coupling procedure described in Example 2 was employed to couple brominated polyphenylene (0.0465 g, 1.5 mmol) to 1-(2'-phenylethynyl)-4-ethynylbenzene (0.521 g, 2.5 mmol) using copper(I) iodide (0.0130 g, 0.068 mmol), dichlorobis(triphenylphosphine)palladium(II) (0.0562 g, 0.08 mmol) and diisopropylamine (0.35 mL, 2.5 mmol) in THF (4 mL) to provide 0.489 g of an ether insoluble brown product. FTIR (KBr) 3029.7, 2212.9, 1595.3, 1508.7, 1474.1, 1439.4, 1388.0, 1100.7, 1003.9 911.5, 834.5, 789.7, 753 8, 688.7, 522.5 cm$^{-1}$. $M_w=3978$; $M_w/M_n=4.3$. TGA showed 10% weight loss at 702° C. and 13% weight loss on heating to 900° C. (20° C./min under nitrogen atmosphere). By visual appearance, the material did not appear to flow during the TGA run.

EXAMPLE 6

Crosscoupling of 1-octyne With Brominated Polyphenylene

The same coupling procedure described in Example 2 was employed to couple brominated polyphenylene (3.66 g, 1.19 mmol) to 1-octyne (0.32 mL, 4.17 mmol) using copper(I) iodide (0.0103 g, 0.054 mmol), dichlorobis(triphenylphosphine)palladium(II) (0.0421 g, 0.060 mmol) and diisopropylamine (0.6 mL, 4.18 mmol) in THF (3 mL) to provide 0.236 g of a hexane insoluble product. FTIR (KBr) 3028.1, 2925.7, 2857.2, 2223.1, 1909.5, 1598.1, 1466.0, 1377.8, 1182.1, 1108.2, 1004.0, 886.9, 815.4, 792.6, 760.8, 695.4 cm$^{-1}$. $M_w=3432$; $M_w/M_n=3.18$. TGA showed 10% weight loss at 430° C. and 33% weight loss on heating to 900° C. (20° C./min under nitrogen atmosphere). DSC showed a melting event at 410° C.

TABLE 1

| | | | Synthesis of Polyphenylenes in Ethereal Solvents | | | | | |
|---|---|---|---|---|---|---|---|---|
| Ex # | Starting Material | t-BuLi (eq.) | Li—X Exch. Solvent | Polym Temp. | Polym Time | Et$_2$O Insol. Mat. | $M_w$ and $M_w/M_n$ | IR Bands (cm$^{-1}$) |
| 1 | 0.472 g | 2.0 | THF | 61° C. | 2 H | 0.0456 g | 2226; 3.671 | 1073.4, 1002.7, 884.4, 808.5, 763.7, 699.6 |
| 2 | 0.472 g | 2.0 | THF | RT | 2 h | 0.0483 g | 1757; 4.572 | 1073.2, 1002.0, 883.8, 808.7, 790.0, 758.7, 697.6 |
| 3 | 0.944 g | 2,0 | Dioxane | 95° C. | 1.5 h | 0.0221 g | Insoluble | 1069.1, 1000.0, 808.9, 763.1, 668.4 |
| 4 | 3.776 g | 2.0 | Dioxane | 95° C. | 1.5 h | 0.1417 g | Insoluble | 1069.9, 1000.5, 809.1, 763.5, 695.9 |
| 5 | 3.776 g | 2.0 | Dioxane | 60° C. | 1.5 h | 0.0975 g | Insoluble | 1069.9, 1000.5, 809.2 |
| 6 | 0.472 g | 2.0 | Et$_2$O | 35° C. | 2 h | 0.0138 g | 529; 3.34 | 1070.7, 1000.6, 808.4, 780.4, 758.9, 692.5 |
| 7 | 3.776 g | 2.0 | Dioxane | 60° C. | 2 h | 0.09 g | Insoluble | 1070.3, 1000.5, 809.4, 763.5, 695.0 |
| 8 | 3.776 g | 2.0 | THF | RT | 2 h | 0.4081 g | 1890; 5.118 | 1074.0, 1004.1, 889.7, 817.0, 788.5, 758.7, 697.3 |
| 9 | 3.776 g | 1.8 | THF | RT | 2 h | 0.5015 g | 2097; 4.842 | 1073.7, 1003.4, 889.9, 815.3, 787.8, 758.1, 697.6 |
| 10 | 3.776 g | 1.5 | THF | RT | 2 h | 0.5925 g | 1220; 3.615 | 1073.3, 1002.2, 888.9, 809.4, 787.3, 758.3, 697.9 |
| 11 | 3.776 g | 1.8 | THF | RT | 2 h | 0.5416 g | 1996; 4.489 | 1073.7, 1003.3, 888.9, 815.0, 787.3, 758.3, 699.0 |
| 12 | 3.776 g | 1.8 | THF | 60° | 2 h | 0.6472 g | 1961; 3.860 | 1073.7, 1003.8, 889.6, 815.5, 788.1, 758.3, 697.4 |
| 13 | 7.552 g | 1.8 | THF | RT | 2 h | 1.0437 g | Insoluble | 1074.0, 1003.8, 889.6, 814.9, 788.4, 759.2, 698.0 |
| 14 | 7.552 g | 1.8 | THF | RT | 2 h | 1.1941 g | 1660; 5.017 | 1074.0, 1003.7, |

TABLE 1-continued
Synthesis of Polyphenylenes in Ethereal Solvents

| Ex # | Starting Material | t-BuLi (eq.) | Li—X Exch. Solvent | Polym Temp. | Polym Time | Et$_2$O Insol. Mat. | M$_w$ and M$_w$/M$_n$ | IR Bands (cm$^{-1}$) |
|---|---|---|---|---|---|---|---|---|
| 15 | 7.552 g | 1.8 | THF | RT | 2 h | 1.1046 g | 2183; 2.11 | 889.7, 815.4, 788.2, 759.0, 698.0 1073.8, 1003.5, 814.1, 787.7, 758.9, 697.2 |
| 16 | 7.552 g | 1.8 | THF | RT | 2 h | 1.1732 g | 1826; 1.51 | 1074.4, 1004.5, 890.2, 817.0, 789.1, 760.9, 698.1 |
| 17 | 7.552 g | 1.8 | THF | 60° C. | 2 h | 1.2624 g | 2733; 4.1895 | 1073.9, 1004.1, 815.8, 788.4, 758.8, 697,5 |
| 18 | 3.776 g | 1.5 | THF | RT | 2 h | 0.651 g | 1432; 4.145 | 1073.7, 1002.6, 687.0, 810.3, 787.1, 761.9, 698.1 |
| 19 | 3.776 g | 1.5 | THF | 60° C. | 2 h | 0.6374 g | 2045; 3.865 | 1074.1, 1003.6, 887.3, 812.3, 786.8, 761.6, 699.2 |
| 20 | 3.776 g | 1.5 | THF | RT | 2 h | 0.7461 g | 1944; 3.888 | 1074.2, 1003.5, 890.4, 812.3, 788.7, 763.1, 699.4 |
| 21 | 3.776 g | 1.5 | THF | 60° C. | 2 min | 0.4967 g | 970; 1.925 | 1073.7, 1002.6, 888.6, 811.3, 787.9, 760.9, 697.6 |
| 22 | 3.776 g | 1.5 | THF | 60° C. | 2 min | 0.7246 g | 1002; 5.247 | 1073.7, 1002.8, 888.2, 812.0, 787.8, 759.0, 697.1 |
| 23 | 3.776 g | 1.5 | THF | 60° C. | 2 min | 0.7032 g | 901; 1.899 | 1074.1, 1003.4, 888.7, 812.2, 787.9, 761.6, 698.8 |
| 24 | 3.776 g | 1.5 | THF | 60° C. | 2 h | 0.7922 g | 1674; 7.419 | 1073.5, 1002.7, 887.8, 811.2, 786.9, 758.9, 697.3 |
| 25 | 3.776 g | 1.5 | THF | 60° C. | 1 h | 0.6311 g | 1984; 4.413 | 1073.8, 1003.1, 889.3, 812.3, 787.4, 761.2, 698.0 |
| 26 | 3.776 g | 1.5 | THF | 60° C. | 1 h | 0.6987 g | 1502; 3.817 | 1073.5, 1002.5, 888.4, 810.2, 787.5, 760.0, 697.9 |
| 27 | 3.776 g | 1.5 | THF | 0° C. | 2 h | 0.2884 g | 1207; 3.752 | 1073.9, 1002.9, 889.8, 810.4, 787.4 |

TABLE 2
Synthesis and Thermal Analysis Data for Polyphenylenes Functionalized With Phenylacetylene

| Ex # | Amt. Start Polymer | M$_w$ of Start Polymer | Amt. of Et$_2$O Insol. Functionalized Prod. | M$_w$ and M$_w$/M$_n$ | Temp. of 10% Wgt. Loss (°C.) | Temp. of Wgt. Loss at 900° C. (%) | IR Bands (cm$^{-1}$) |
|---|---|---|---|---|---|---|---|
| 1 | 0.400 g | 2255 | 0.3743 g | 3258; 5.5001 | 642 | 15 | 1004.0, 889.4, 816.6, 789.4, 754.0, 689.1 |
| 2 | 0.2934 g | 1603 | 0.2266 g | 2706; 2.8415 | 670 | 14 | 1003.8, 911.1, 890.2, 816.8, 789.2, 753.7, 688.7 |
| 3 | 0.2212 g | 2209 | 0.1803 g | 3434; 3.605 | 572 | 18 | 1004.0, 910.4, 888.6, 818.2, 789.2, 754.3 |
| 4 | 0.7326 g | 1394 | 0.5362 g | 2654; 2.7385 | 492 | 33 | 1004.1, 888.7, 818.2, 789.3, 754.8, 690.3 |
| 5 | 0.6909 g | 1944 | 0.4902 g | 3219; 2.020 | 652 702* | 15 13* | 1003.8, 911.0, 817.8, 789.2, 753.9, 688.6 |
| 6 | 0.6167 g | 1143 | 0.4186 g | 2868; 3.564 | 496 | 21 | 1004.0, 889.9, 817.9, 789.1, 754.0, 689.3 |

Thermal analysis were performed under a nitrogen atmosphere using a heating rate of 20° C./min (unless otherwise noted). * Heating rate 2.5° C./min.

We claim:

1. A method for producing polymeric carbon comprising the steps of (a) polymerizing 1-bromo-4-lithiobenzene to form a brominated polyphenylene having brominated and non-brominated residues within the polymer, wherein the ratio of non-brominated residues to brominated residues is 5 or less;

(b) functionalizing the brominated polyphenylene to replace the bromide groups with a substituted or unsubstituted acetylene group; and (c) heating the functionalized polymer to a temperature of 900° C. in an inert atmosphere to form polymeric carbon.

2. A method according to claim 1, wherein the 1-bromo-4-lithiobenzene is polymerized in an ethereal solvent.

3. A method according to claim 2, wherein the solvent is tetrahydrofuran.

4. A method according to claim 1, wherein the brominated polyphenylene is functionalized using a palladium catalyst and a copper catalyst.

5. A method according to claim 4, wherein the brominated polyphenylene is functionalized with an acetylene selected from among phenylacetylenes, silylacetylenes and n-alkylacetylenes.

6. A method according to claim 5, wherein the brominated polymer is functionalized with phenylacetylene.

7. A method according to claim 4, wherein the 1-bromo-4-lithiobenzene is polymerized in an ethereal solvent.

8. A method according to claim 7, wherein the solvent is tetrahydrofuran.

9. A method according to claim 7, wherein the brominated polyphenylene is functionalized with an acetylene selected from among phenylacetylenes, silylacetylenes and alkylacetylenes.

10. A method according to claim 7, wherein the brominated polymer is functionalized with phenylacetylene.

11. A method according to claim 1, wherein the functionalized polymer is heated to a temperature of about 900° C. in a nitrogen atmosphere.

12. A method according to claim 11, wherein the 1-bromo-4-lithiobenzene is polymerized in an ethereal solvent.

13. A method according to claim 12, wherein the solvent is tetrahydrofuran.

14. A method according to claim 11, wherein the brominated polyphenylene is functionalized using a palladium catalyst and a copper catalyst.

15. A method according to claim 14, wherein the brominated polyphenylene is functionalized with an acetylene selected from among phenylacetylenes, silylacetylenes and alkylacetylenes.

16. A method according to claim 14, wherein the brominated polymer is functionalized with phenylacetylene.

17. A method according to claim 14, wherein the 1-bromo-4-lithiobenzene is polymerized in an ethereal solvent.

18. A method according to claim 17, wherein the solvent is tetrahydrofuran.

19. A method according to claim 17, wherein the brominated polyphenylene is functionalized with an acetylene selected from among phenylacetylenes, silylacetylenes and alkylacetylenes.

20. A method according to claim 17, wherein the brominated polymer is functionalized with phenylacetylene.

* * * * *

UNITED STATES PATENT AND TRADEMARK OFFICE
CERTIFICATE OF CORRECTION

PATENT NO. : 5,236,686

DATED : August 17, 1993

INVENTOR(S) : Tour et al.

It is certified that error appears in the above-indentified patent and that said Letters Patent is hereby corrected as shown below:

Col. 2, line 37, "5,16" should read --5,169,929--;

Col. 4, line 64, "CDC113" should read --CDC13--;

Col. 6, line 8 "1003.9 911.5" should read --1003.9,911.5--;

Col. 6, line 8 "753 8" should read --753.8--.

Signed and Sealed this

Twentieth Day of September, 1994

Attest:

BRUCE LEHMAN

Attesting Officer     Commissioner of Patents and Trademarks